(12) United States Patent
Carrick et al.

(10) Patent No.: US 7,422,999 B2
(45) Date of Patent: Sep. 9, 2008

(54) OVERBASED VATERITE CONTAINING SALT COMPOSITION

(75) Inventors: Virginia A. Carrick, Chardon, OH (US); James P. Roski, Wickliffe, OH (US); Daniel E. Barrer, Richmond Heights, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 546 days.

(21) Appl. No.: 11/057,514

(22) Filed: Feb. 14, 2005

(65) Prior Publication Data

US 2006/0183650 A1 Aug. 17, 2006

(51) Int. Cl.
 *C10M 159/24* (2006.01)
(52) U.S. Cl. ...................... 508/401; 508/391
(58) Field of Classification Search ................. 508/391, 508/401
 See application file for complete search history.

(56) References Cited

U.S. PATENT DOCUMENTS

| | | | |
|---|---|---|---|
| 3,372,115 A | 3/1968 | McMillen et al. | |
| 3,377,283 A | 4/1968 | McMillen | |
| 3,446,736 A | 5/1969 | Herd et al. | |
| 3,766,066 A | 10/1973 | McMillen | |
| 3,766,067 A | 10/1973 | McMillen | |
| 3,816,310 A | 6/1974 | Hunt | |
| 4,328,111 A | 5/1982 | Watson et al. | |
| 4,487,704 A | 12/1984 | Yamaguchi et al. | |
| 4,560,489 A | 12/1985 | Muir et al. | |
| 4,597,880 A | 7/1986 | Eliades | |
| 4,659,488 A * | 4/1987 | Vinci | 508/324 |
| 4,668,409 A | 5/1987 | Yamaguchi et al. | |
| 4,822,502 A | 4/1989 | Muir | |
| 4,824,584 A | 4/1989 | Muir et al. | |
| 4,929,373 A | 5/1990 | Powers et al. | |
| 4,995,993 A | 2/1991 | Papke et al. | |
| 5,108,630 A | 4/1992 | Black et al. | |
| 5,132,033 A | 7/1992 | Jao et al. | |
| 5,171,462 A * | 12/1992 | DeRosa et al. | 508/281 |
| 5,213,697 A | 5/1993 | Vinci et al. | |
| 5,244,957 A | 9/1993 | Best et al. | |
| 5,332,776 A | 7/1994 | Best et al. | |
| 5,338,346 A | 8/1994 | Luttiger et al. | |
| 5,338,467 A | 8/1994 | Olson et al. | |
| 5,439,602 A | 8/1995 | Eckard et al. | |
| 5,505,867 A | 4/1996 | Ritter | |
| 5,919,741 A | 7/1999 | Jaynes et al. | |
| 6,015,778 A | 1/2000 | Rolfes et al. | |
| 6,107,259 A | 8/2000 | Muir et al. | |
| 6,268,318 B1 | 7/2001 | Rolfes et al. | |
| 2005/0124510 A1 * | 6/2005 | Costello et al. | 508/306 |
| 2005/0215442 A1 * | 9/2005 | Sivik et al. | 508/460 |

FOREIGN PATENT DOCUMENTS

| | | |
|---|---|---|
| EP | 0 025 328 A1 | 3/1981 |
| EP | 25328 A1 * | 3/1981 |
| EP | 0459 399 A1 | 12/1991 |
| EP | 0 949 322 A2 | 10/1999 |
| GB | 2 146 348 | 4/1985 |
| WO | 00/04113 | 1/2000 |

* cited by examiner

*Primary Examiner*—Glenn Caldarola
*Assistant Examiner*—Jim Goloboy
(74) *Attorney, Agent, or Firm*—David M. Shold; Christopher D. Hilker

(57) ABSTRACT

This invention relates to an overbased vaterite containing composition, comprising: a disperse medium, and a calcium salt and calcium carbonate dispersed in the disperse medium, at least about 50% by weight of the calcium carbonate being in the form of vaterite, the composition being substantially haze free.

18 Claims, No Drawings

OVERBASED VATERITE CONTAINING SALT COMPOSITION

TECHNICAL FIELD

This invention relates to overbased vaterite containing salt compositions, and to lubricating oil and functional fluid compositions containing such overbased vaterite containing salt compositions.

BACKGROUND OF THE INVENTION

Among the materials that impart detergency to lubricating oils to keep internal engine parts clean and reduce sludge formation in the oil are overbased detergents, for example, calcium sulfonates. The term "overbased" is a term of art which is generic to well known classes of metal salts or complexes. These materials have also been referred to as "basic," "superbased," "hyperbased," "high-metal containing salts," and the like. Overbased compositions are metal salts or complexes characterized by a metal content in excess of that which would be present according to the stoichiometry of the metal and the particular acidic organic compound, e.g., a sulfonic acid, reacted with the metal.

Overbased calcium sulfonates are generally produced by carbonating a mixture of a disperse medium, a sulfonic acid, calcium oxide or calcium hydroxide, and promoters such as methanol and water. The calcium oxide or hydroxide reacts with the gaseous carbon dioxide to form calcium carbonate. The sulfonic acid is neutralized with an excess of CaO or $Ca(OH)_2$ to form the sulfonate. The calcium carbonate may be either amorphous and/or in one or more of its crystalline forms. The common crystalline forms of calcium carbonate are vaterite (hexagonal), calcite (hexagonal-rhombohedral), and aragonite (orthorhombic). Calcite is the most thermodynamically stable form. Both vaterite and aragonite are metastable at normal temperatures. Aragonite is not commonly observed in overbased calcium sulfonates. For lubricating oil compositions such as engine oils, the calcium carbonate that is used is typically amorphous.

Overbased calcium sulfonate detergents containing crystalline calcium carbonate disclosed in the prior art are hazy and exhibit poor oil solubility. These detergents tend to have relatively high viscosities of about 1000 cSt or higher at 100° C. Overbased calcium sulfonates of this type are disclosed, for example, in U.S. Pat. Nos. 3,242,079; 3,376,222 and 4,560,489. These sulfonates are described as being useful as additives for greases, paints (for rheology control) and metal working fluids (as extreme pressure (EP) agents).

The lubricating oil art, particularly as directed to automotive crankcase and other engine oils, mandates a clear or substantially haze free product for requisite consumer aesthetics and acceptance. This need has precluded the use of prior art detergents with haze producing crystalline calcium carbonate.

For more than 40 years, zinc dialkyl dithiophosphates (ZDDP) have been used as antiwear additives in engine lubricating oil compositions. During this period typical concentrations of phosphorus contributed to the lubricating oil compositions by these compounds exceeded 0.10% by weight. However, ILSAC GF-3 requirements subsequently came into effect and these requirements limit the amount of phosphorus that can be used in a lubricating oil composition to a maximum concentration of 0.10% by weight. There are also marketing reasons for requiring lower phosphorus levels, for example, phosphorus levels up to about 0.08% by weight, due to the fact that phosphorus tends to reduce emission catalyst life and the desire in the marketplace to prolong such catalyst life. This has resulted in the need for reformulating many engine lubricating oil compositions to provide such engine lubricating oil compositions with lower levels of phosphorus and yet still maintain adequate levels of antiwear protection.

The problem is to provide low-phosphorus engine lubricating oil compositions with desired anti-wear properties and at the same time provide haze levels that are sufficiently low to be commercially acceptable. In at least one embodiment of the invention, the overbased vaterite containing salt compositions of the present invention provide a solution to this problem. These overbased vaterite containing salt compositions, in at least one embodiment, are substantially haze free and provide enhanced antiwear properties to engine lubricating oil compositions. These overbased vaterite containing salt compositions may also be advantageously employed as additives in functional fluids such as metal working fluids.

SUMMARY OF THE INVENTION

This invention relates to an overbased vaterite containing salt composition, comprising: a disperse medium, and a calcium salt and calcium carbonate dispersed in the disperse medium, at least about 50% by weight of the calcium carbonate being in the form of vaterite, the composition being substantially haze free.

In one embodiment, the invention relates to a process for making an overbased vaterite containing salt composition, comprising: (i) mixing an overbased amorphous calcium carbonate containing salt composition with water and an alcohol mixture comprising at least one lower alcohol and at least one midlevel alcohol; and (ii) contacting the resulting mixture with an acidic material comprising $CO_2$ until at least about 50% by weight of the amorphous calcium carbonate is converted to vaterite. In one embodiment, the overbased amorphous calcium carbonate containing salt composition used in step (i) is made using at least one calcium compound and $CO_2$ and the amount of $CO_2$ used in steps (i) and (ii) is in excess on a molar basis of the amount of calcium compound used in step (i). In one embodiment, the resulting mixture used in step (ii) contains a strong base and the amount of $CO_2$ used in step (ii) is sufficient as determined by DBN to neutralize the strong base.

In one embodiment, the invention relates to a process for making an overbased vaterite containing salt composition, comprising: (i) mixing an overbased amorphous calcium carbonate containing salt composition with water and an alcohol mixture comprising methanol, isobutyl alcohol and amyl alcohol; and (ii) contacting the resulting mixture with $CO_2$ at a temperature in the range from about 45° C. to about 80° C. until at least about 50% by weight of the amorphous calcium carbonate is converted to vaterite, the overbased amorphous calcium carbonate containing salt composition containing a remaining amount of calcium oxide and/or calcium hydroxide at the start of step (ii) and the amount of $CO_2$ used in step (ii) being in excess on a molar basis of the remaining amount of calcium oxide and/or calcium hydroxide in the overbased amorphous calcium carbonate containing salt composition at the start of step (ii) as determined by DBN.

DESCRIPTION OF THE PREFERRED EMBODIMENTS

The term "hydrocarbyl" may denote a group having a carbon atom directly attached to the remainder of the molecule and having a hydrocarbon or predominantly hydrocarbon character within the context of this invention. Such groups include the following:

(1) Purely hydrocarbon groups; that is, aliphatic, alicyclic, aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Examples include methyl, ethyl, cyclohexyl, phenyl, etc.

(2) Substituted hydrocarbon groups; that is, groups containing non-hydrocarbon substituents which do not alter the predominantly hydrocarbon character of the group. Examples include hydroxyl, nitro, cyano, alkoxy, acyl, etc.

(3) Hetero groups; that is, groups which, while predominantly hydrocarbon in character, contain atoms other than carbon in a chain or ring otherwise composed of carbon atoms. Suitable hetero atoms include nitrogen, oxygen and sulfur.

In general, no more than three substituents or hetero atoms, and typically no more than one, may be present for each 10 carbon atoms in the hydrocarbyl group.

The term "lower alcohol" may be used herein to refer to methanol, ethanol or a mixture thereof. In one embodiment, propanol may be included as a lower alcohol.

The term "midlevel alcohol" may be used herein to refer to alcohols containing from about 4 to about 8 carbon atoms, and in one embodiment from 4 to about 6 carbon atoms. If not included as a lower alcohol, propanol, in one embodiment, may be included as a midlevel alcohol. In one embodiment, a midlevel alcohol may contain a mixture of $C_4$ and $C_5$ alcohols. In one embodiment, a midlevel alcohol may contain a mixture of $C_4$, $C_5$ and $C_6$ alcohols. In one embodiment, a midlevel alcohol may contain a mixture of $C_4$ and $C_6$ alcohols.

The term "oil-soluble" refers to a material that is soluble in mineral oil to the extent of at least one gram per liter at 25° C.

The term "TBN" refers to total base number. This is the amount of perchloric acid needed to neutralize all of a material's basicity, expressed as milligrams of KOH per gram of sample.

The term "DBN" refers to direct base number. DBN measures the strong base component of a composition and is determined by titration to phenolphthalein neutral point of a sample of the composition dissolved in isopropanol/toluene solvent with added water/sugar solution.

The term "strong base" refers to calcium oxide, calcium hydroxide, calcium alkoxide and/or calcium phenoxide.

The term "vaterite" refers to a hexagonal crystalline form of calcium carbonate which exhibits a peak in the infrared spectrum at about 874 $cm^{-1}$.

The Overbased Vaterite Containing Salt Composition

The inventive overbased vaterite containing salt composition may be derived from an overbased amorphous calcium carbonate containing salt composition. The overbased amorphous calcium carbonate containing salt composition may be prepared by contacting a reaction mixture comprising: at least one organic material to be overbased; a disperse medium comprising at least one inert, organic solvent/diluent for the organic material to be overbased; a stoichiometric excess of at least one calcium compound; and at least one promoter; with at least one acidic material comprising $CO_2$. Methods of preparing overbased salt compositions such as these overbased amorphous calcium carbonate containing salt compositions are well known in the art and are disclosed, for example, in the following U.S. Pat. Nos. 3,242,097; 3,242,080; 3,250,710; 3,256,186; 3,274,135; 3,372,115; 3,492,231; 3,766,076; 5,213,697; 6,015,778; and 6,268,318 B1. These patents are incorporated herein by reference.

The organic material to be overbased may be an organic sulfur acid, carboxylic acid, lactone or phenol. The organic sulfur acids include oil-soluble organic sulfur acids such as sulfonic, sulfamic, thiosulfonic, sulfinic, sulfenic, partial ester sulfuric, sulfurous and thiosulfuric acid. Generally they are salts of aliphatic or aromatic sulfonic acids. The sulfonic acids include the mono- or poly-nuclear aromatic or cycloaliphatic compounds.

The carboxylic acids include aliphatic, cycloaliphatic, and aromatic mono- and polybasic carboxylic acids such as the naphthenic acids, aliphatic hydrocarbyl-substituted cyclopentanoic acids, aliphatic hydrocarbyl-substituted cyclohexanoic acids, aliphatic hydrocarbyl-substituted aromatic carboxylic acids. The aliphatic acids generally contain at least about 8 carbon atoms, and in one embodiment at least about 12 carbon atoms. Usually they have no more than about 400 carbon atoms. The cycloaliphatic and aliphatic carboxylic acids can be saturated or unsaturated.

A useful group of carboxylic acids are the oil-soluble aromatic carboxylic acids. These acids are represented by the formula:

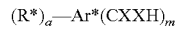

wherein R* is an aliphatic hydrocarbyl group of about 4 to about 400 aliphatic carbon atoms, a is an integer of from one to four, Ar* is a polyvalent aromatic hydrocarbon nucleus of up to 14 carbon atoms, each X is independently a sulfur or oxygen atom, and m is an integer of from one to four with the proviso that R* and a are such that there is an average of at least about 8 aliphatic carbon atoms provided by the R*.

The carboxylic acids include aliphatic-hydrocarbyl substituted salicylic acids wherein each aliphatic hydrocarbyl substituent contains an average of at least about 8 carbon atoms, and in one embodiment at least about 16 carbon atoms per substituent, and the acids contain one to three substituents per molecule. An example of such an aliphatic-hydrocarbyl substituted salicylic acid is $C_{16}$-$C_{18}$ alkyl salicylic acid.

The lactones may be represented by the formula

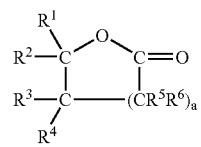

wherein $R^1$, $R^2$, $R^3$, $R^4$, $R^5$ and $R^6$ are independently H, hydrocarbyl groups or hydroxy substituted hydrocarbyl groups of from 1 to about 30 carbon atoms, with the proviso that the total number of carbon atoms must be sufficient to render the lactones oil soluble; $R^2$ and $R^3$ can be linked together to form an aliphatic or aromatic ring; and a is a number in the range of zero to 4. A useful lactone can be prepared by reacting an alkyl (e.g., dodecyl) phenol with glyoxylic acid at a molar ratio of about 2:1.

The phenols may be represented by the formula

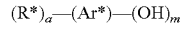

wherein R*, a, Ar*, and m have the same meaning as described above.

The disperse medium may comprise any inert organic liquid that functions as a solvent or a diluent for the organic material to be overbased. These include aliphatic hydrocarbons, cycloaliphatic hydrocarbons, aromatic hydrocarbons, liquid petroleum fractions, or mixture of two or more thereof.

Included within this group are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof, are examples of sources of suitable organic liquids which can function as the disperse medium. In one embodiment, the disperse medium may comprise mineral oil.

The calcium compound may comprise an alkoxide, carbonate, hydrogen carbonate, hydroxide, oxide, and/or amide. Calcium hydroxide and calcium oxide may be especially useful.

The promoter may comprise an alcohol of 1 to about 12 carbon atoms, and in one embodiment 1 to about 5 carbon atoms. Examples include methanol, ethanol, isopropanol, isobutyl alcohol, amyl alcohol, octanol, or a mixture of two or more thereof. In one embodiment, methanol, a mixture of isobutyl alcohol and amyl alcohol, or a combination thereof, may be used.

The acidic material comprises $CO_2$ and, in one embodiment, may further comprise one or more of formic acid, acetic acid, nitric acid, sulfonic acid, hydrochloric acid, hydrobromic acid, carbamic acid, $SO_2$, $SO_3$, $H_2S$, $N_2O_3$, and the like. The acidic material may comprise $CO_2$ at a concentration of at least about 80% by volume of the acidic material, and in one embodiment at least about 90% by volume, and in one embodiment at least about 95% by volume, and in one embodiment at least about 98% by volume, and in one embodiment about 100% by volume of the acidic material is $CO_2$.

In one embodiment, the overbased amorphous calcium carbonate containing salt composition may be prepared by contacting a mixture of the organic material to be overbased, the disperse medium, the calcium compound, and the promoter, with the acidic material. A chemical reaction ensues. The temperature may range from about 50° C. to about 80° C., and in one embodiment from about 55° C. to about 65° C. The exact nature of the resulting overbased amorphous calcium carbonate containing salt composition may not be known. However, it can be described for purposes of the present specification as an amorphous calcium salt formed from the reaction of the acidic material with the calcium compound and the organic material to be overbased. Thus, if mineral oil is used as the disperse medium, petrosulfonic acid is used as the organic material to be overbased, $Ca(OH)_2$ is used as the calcium compound, and $CO_2$ is used as the acidic material, the resulting overbased amorphous calcium carbonate containing salt composition may be described as an oil solution of amorphous calcium carbonate and calcium petrosulfonate.

The inventive overbased vaterite containing salt composition may be made by: (i) mixing the foregoing overbased amorphous calcium carbonate containing salt composition with water and an alcohol mixture comprising at least one lower alcohol and at least one midlevel alcohol, and (ii) contacting the resulting mixture with an acidic material to convert at least part of the amorphous calcium carbonate to vaterite. The temperature during step (ii) may be in the range from about 45° C. to about 80° C., and in one embodiment from about 50° C. to about 70° C., and in one embodiment from about 58° C. to about 65° C., and in one embodiment from about 60° C. to about 62° C. The acidic material may comprise $CO_2$ and may further comprise one of the additional acidic materials discussed above. In one embodiment, the acidic material is $CO_2$. The weight ratio of lower alcohol to midlevel alcohol may be in the range from about 7:1 to about 1:2, and in one embodiment about 2:1. The weight ratio of water to alcohol (i.e., the mixture of lower alcohol and midlevel alcohol) may be in the range from about 1:10 to about 1:30, and in one embodiment about 1:15. In one embodiment, the temperature during step (ii) may be in the range from about 45° C. to about 60° C., and the weight ratio of water to alcohol (i.e., the mixture of lower alcohol and midlevel alcohol) may be in the range from about 1:10 to about 1:20, and in one embodiment about 1:12. In one embodiment, the weight ratio of lower alcohol to water may be in the range from about 7:1 to about 20:1, and in one embodiment about 10:1. In one embodiment, the weight ratio of the combination of water and lower alcohol to midlevel alcohol may be in the range from about 1:1 to about 5:1, and in one embodiment about 2:1. In one embodiment, the temperature during step (ii) may be in the range from about 55° C. to about 80° C. and the weight ratio of the combination of water and lower alcohol to midlevel alcohol may be in the range from about 1:1 to about 3:1, and in one embodiment about 2:1. In one embodiment, the alcohol mixture may comprise methanol in combination with one or more alcohols containing from about 4 to about 8 carbon atoms, and in one embodiment from about 4 to about 6 carbon atoms. In one embodiment, the alcohol mixture may comprise methanol, isobutyl alcohol and amyl alcohol. The concentration of the amorphous calcium carbonate containing salt composition in the mixture used in step (i) may range from about 78 to about 95% by weight, and in one embodiment about 85 to about 95% by weight. The concentration of water in the mixture used in step (i) may range from about 0.2 to about 2% by weight, and in one embodiment from about 0.5 to about 1.5% by weight. In one embodiment, the concentration of water in the mixture used in step (i) may be in the range from about 0.2 to about 1.2% by weight when the temperature during step (ii) is in the range from about 55° C. to about 80° C. In one embodiment, the concentration of water in the mixture used in step (i) may be in the range from about 0.7 to about 2% by weight when the temperature during step (ii) is in the range from about 45° C. to about 55° C. The concentration of lower alcohol in the mixture used in step (i) may be in the range from about 5 to about 15% by weight, and in one embodiment from about 8 to about 12% by weight. The concentration of midlevel alcohol used in step (i) may be in the range from about 2 to about 10% by weight, and in one embodiment from about 3 to about 6% by weight.

In one embodiment, the amount of $CO_2$ used in steps (i) and (ii) may be in excess on a molar basis of the amount of calcium compound (e.g., CaO, $Ca(OH)_2$) used in step (i). In one embodiment, the amount of $CO_2$ used in step (ii) may be sufficient as measured by DBN to neutralize the strong base remaining in the reaction mixture. In one embodiment, the rate of addition of $CO_2$ for a 500 gram scale reaction may be about 1.5 cubic feet per hour (CFH) for about 5 to about 7 hours, and in one embodiment about 1 CFH for about 6 hours.

The inventive overbased vaterite containing salt composition comprises the foregoing disperse medium and a calcium salt and calcium carbonate dispersed in the disperse medium, at least about 40% by weight of the calcium carbonate being in the form of vaterite. In one embodiment, at least about 50% by weight of the calcium carbonate is in the form of vaterite, and in one embodiment at least about 60% of the calcium carbonate is vaterite, and in one embodiment at least about 70% by weight of the calcium carbonate is vaterite, and in one embodiment at least about 80% by weight of the calcium carbonate is vaterite, and in one embodiment at least about 90% by weight of the calcium carbonate is vaterite, and in one embodiment at least about 95% by weight of the calcium carbonate is vaterite. In one embodiment, all or substantially all of the calcium carbonate is in the form of vaterite.

The inventive overbased vaterite containing salt composition may contain particulate solids. The average size of these particulate solids may be up to about 200 nanometers (nm), and in one embodiment from about 100 to about 200 nm, and in one embodiment about 125 to about 175 nm.

The inventive overbased vaterite containing salt composition may have a TBN in the range up to about 400 mg of KOH per gram of sample, and in one embodiment from about 150 to about 300, and in one embodiment from about 200 to about 250 mg of KOH per gram of sample.

The viscosity of the inventive overbased vaterite containing salt composition may range from about 50 to about 1000 cSt at 100° C. when the diluent content of the composition is about 42% by weight, and in one embodiment from about 150 to about 200 cSt at 100° C. when the diluent oil content of the composition is about 42% by weight.

The inventive overbased vaterite containing salt composition may be soluble in mineral oil to the extent of at least about 50 grams per liter at 25° C.

The inventive overbased vaterite containing salt compositions may be substantially haze free. In one embodiment, the term "substantially haze free" refers to a Hazitron number of less than about 200, and in one embodiment less than about 100, and in one embodiment less than about 50, and in one embodiment less than about 30. The Hazitron number may be obtained using a Hazitron instrument to provide a relative indication of light scattering caused by haze. The test procedure is based on measurements of transmitted light by the sample placed in two positions of a sample compartment of the Hazitron instrument. A cuvette filled with the sample is placed in the right side of the sample compartment, adjacent to a measuring photocell, and the instrument is balanced with a numbered dial set on "0". The cuvette is then shifted to the left side of the sample compartment and the instrument is re-balanced using the numbered dial. The reading on the numbered dial minus the cuvette correction number gives the Hazitron number. The higher the number the hazier the sample.

In one embodiment, the term "substantially haze free" refers to a turbidity value less than about 300 Jackson Turbidity Units (JTUs). In one embodiment the term "substantially haze free" refers to a turbidity value less than about 200 JTUs, and in one embodiment less than about 100 JTUs, and in one embodiment less than about 75 JTUs. The turbidity values may be measured using a Monitek Model 151 turbidimeter or an equivalent thereof. A sample of the composition to be tested is diluted with a standard oil in a glass tube. Entrained air bubbles are removed. The tube is placed in the turbidimeter. Light passes through the sample. The results are expressed in JTUs. A higher JTU value indicates a higher degree of haze for the sample.

EXAMPLE 1

Part (A):

A 300 TBN overbased amorphous calcium carbonate containing sulfonate is prepared in a 3 liter flask equipped with stirrer, thermowell, thermometer, subsurface inlet valve, and cold water condenser. To the flask is added 726 g of 100 neutral oil, 71 g of polyisobutylene (940 number average molecular weight) substituted succinic anhydride, 84 g of an isobutyl alcohol/amyl alcohol mixture (1:1 weight ratio), and 53 g of calcium hydroxide. A mixture of 3.54 g of calcium chloride in 22 g of water is separately prepared and added to the flask. To this mixture is added slowly a total of 617 g of monoalkylbenezenesulfonic acid having a number average molecular weight of about 480 (85% active ingredient and 15% unsulfonated alkylates), while maintaining the temperature below 80° C. during the addition. The mixture is heated to 150° C. to dry, then cooled to room temperature to about 50° C. To the mixture is added, with stirring, 53 g of an oil solution of a calcium salt of methylene coupled alkylphenol (65% diluent oil), 167 g of methanol, and 84 g of isobutyl alcohol/amyl alcohol mixture, while maintaining the temperature at 48-52° C.

To this mixture is added a charge of 103 g of calcium hydroxide followed by addition of carbon dioxide to a DBN of 45 KOH equivalents. Three additional charges of calcium hydroxide are added, each of 103 g, followed in each case by addition of carbon dioxide. Carbon dioxide is discontinued when the DBN of the mixture is in the range of 45 to 55.

The mixture is heated to 150° C. under distillation conditions with a nitrogen sweep and held at that temperature for one hour to remove volatile materials. The mixture is passed through a filter using diatomaceous earth filter aid, yielding the overbased amorphous calcium carbonate containing sulfonate as the filtrate. The overbased amorphous calcium carbonate containing sulfonate may be described as an oil solution of amorphous calcium carbonate and calcium monoalkylbenzene sulfonate.

Part (B):

The overbased amorphous calcium carbonate containing sulfonate made in Part (A) (500 parts by weight) is mixed with methyl alcohol (50 parts by weight), an isobutyl alcohol/isoamyl alcohol mixture having a 50:50 weight ratio (20 parts by weight), and water (5 parts by weight). The resulting mixture is heated at 60° C. and blown with $CO_2$ at a flow rate of 0.25 standard cubic feet per hour (SCFH) until 70% by weight of the amorphous calcium carbonate is converted to crystalline vaterite as determined by infrared analysis. Crystalline vaterite shows a peak at 874 $cm^{-1}$. The resulting overbased vaterite containing salt composition has a turbidity value of 71 JTUs and a viscosity of 293 cSt at 100° C.

Concentrate

The inventive overbased vaterite containing salt compositions may be combined with a diluent and supplied in concentrate form. The diluent may comprise a substantially inert, normally liquid organic diluent such as mineral oil, synthetic oil, naphtha, alkylated (e.g., $C_{10}$-$C_{13}$ alkyl) benzene, toluene or xylene. These concentrates may contain from about 1% to about 99% by weight, and in one embodiment about 10% to about 90% by weight of the diluent.

Lubricating Oil and Functional Fluid Compositions.

The inventive lubricating oil and functional fluid compositions may comprise the inventive overbased vaterite containing salt composition and a base oil. The lubricating oil compositions may include lubricating oils and greases useful in industrial applications and in automotive engines, transmissions and axles. The lubricating oil compositions may be used in a variety of applications including engine oils for spark-ignited or compression-ignited internal combustion engines, including automobile and truck engines, two-cycle engines, aviation piston engines, marine and low-load diesel engines, and the like. The lubricating oil compositions include transaxle lubricants, gear lubricants, and the like. The functional fluids include automatic transmission fluids, gear oils, metalworking fluids, hydraulic fluids, and the like.

The base oil used in the inventive lubricating oil and functional fluid compositions may be selected from any of the base oils in Groups I-V as specified in the American Petroleum Institute (API) Base Oil Interchangeability Guidelines. The five base oil groups are as follows:

| Base Oil Category | Sulfur (%) | | Saturates(%) | Viscosity Index |
|---|---|---|---|---|
| Group I | >0.03 | and/or | <90 | 80 to 120 |
| Group II | ≦0.03 | and | ≧90 | 80 to 120 |
| Group III | ≦0.03 | and | ≧90 | ≧120 |
| Group IV | All polyalphaolefins (PAOs) | | | |
| Group V | All others not included in Groups I, II, III or IV | | | |

Groups I, II and III are mineral oil base stocks.

The base oil may be a natural oil, synthetic oil or mixture thereof. The natural oils include animal oils and vegetable oils (e.g., castor oil, lard oil) as well as mineral lubricating oils such as liquid petroleum oils and solvent treated or acid-treated mineral lubricating oils of the paraffinic, naphthenic or mixed paraffinic-naphthenic types. Oils derived from coal or shale are also useful.

Synthetic oils include hydrocarbon oils such as polymerized and interpolymerized olefins, alkylbenzenes, polyphenyls, alkylated diphenyl ethers, alkylated diphenyl sulfides, and derivatives, analogs and homologs thereof. The synthetic oils include alkylene oxide polymers and interpolymers and derivatives thereof where the terminal hydroxyl groups have been modified by esterification, etherification, etc.; esters of dicarboxylic acids (e.g., phthalic acid, succinic acid, alkyl succinic acids, alkenyl succinic acids, etc.) with a variety of alcohols (e.g., butyl alcohol, hexyl alcohol, dodecyl alcohol, 2-ethylhexyl alcohol, ethylene glycol, etc.); and esters made from $C_5$ to $C_{12}$ monocarboxylic acids and polyols or polyol ethers. The base oil may be a polyalphaolefin (PAO) or an oil derived from Fischer-Tropsch synthesized hydrocarbons.

Unrefined, refined and rerefined oils, either natural or synthetic (as well as mixtures of two or more of any of these) of the type disclosed hereinabove can be used as the base oil.

The base oil may be present in the lubricating oil or functional fluid composition in a major amount, typically greater than about 50% by weight, and in one embodiment greater than about 60% by weight, and in one embodiment greater than about 70% by weight, and in one embodiment greater than 75% by weight of the lubricating oil or functional fluid composition.

The inventive lubricating oil and functional fluid composition may contain one or more detergents or dispersants of the ash-producing or ashless type. The ash-producing detergents may be exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. These may be blown with steam. The salts of such acids include sodium, potassium, lithium, calcium, magnesium, strontium and barium.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 34 carbon atoms, and in one embodiment at least about 54 carbon atoms with nitrogen containing compounds such as amine, organic hydroxy compounds such as phenols and alcohols, and/or basic inorganic materials.

(2) Reaction products of relatively high molecular weight aliphatic or alicyclic halides with amines such as oxyalkylene polyamines. These may be characterized as "amine disperants."

(3) Reaction products of alkyl phenols in which the alkyl group contains at least about 30 carbon atoms with aldehydes (especially formaldehyde) and amines (especially polyalkylene polyamines), which may be characterized as "Mannich dispersants."

(4) Products obtained by post-treating the amine-containing products disclosed in paragraphs (1), (2) and/or (3) with such reagents as urea, thiourea, carbon disulfide, aldehydes, ketones, carboxylic acids, hydrocarbon-substituted succinic anhydrides, nitriles, epoxides, boron compounds, phosphorus compounds, and the like.

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants."

The inventive lubricating oil and functional fluid compositions may contain one or more extreme pressure agents, antiwear agents, corrosion inhibitors, oxidation inhibitors and/or friction modifiers. Extreme pressure agents and corrosion- and oxidation-inhibiting agents which may be included in the lubricants and functional fluids may be exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (moledular weight 500)-substituted phenyl phosphite, diisobutyl-substituted phenyl phosphite; metal thiocarbamates such as zinc dioctyldithiocarbamate and barium hepthylphenyl dithiocarbamate; dithiocarbamate esters from the reaction product of dithiocarbamic acid and acrylic, methacrylic, maleic, fumaric or itaconic esters; dithiocarbamate containing amides prepared from dithiocarbamic acid and an acrylamide; alkylene-coupled dithiocarbamates; sulfur-coupled dithiocarbamates. Included in this group are alkali and alkaline earth metal salts of hydrocarbyl substituted saligenins. Group II metal phosphorodithioates such as zinc dicyclohexylphosphorodithioate, zincdioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and 4-methyl-2-pentanol or isopropyl alcohol and 2-ethyl hexanol.

The inventive lubricating oil and functional fluid compositions may contain one or more pour point depressants, color stabilizers and/or anti-foam agents. Examples of useful pour point depressants include polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl esters. Typical anti-foam agents include polydimethylsiloxanes.

Each of the foregoing additives, when used, is used at a functionally effective amount to impart the desired properties to the lubricant. Generally, the concentration of each of these additives, when used, ranges from about 0.001% to about 20% by weight, and in one embodiment about 0.01% to about 10% by weight based on the total weight of the lubricating oil or functional fluid composition.

The additives may be added directly to the lubricating oil or functional fluid composition. In one embodiment, however, they are diluted with a substantially inert, normally liquid organic diluent such as mineral oil, synthetic oil, naphtha, alkylated (e.g., $C_{10}$-$C_{13}$ alkyl) benzene, toluene or xylene to form an additive concentrate. These concentrates may contain from about 1% to about 99% by weight, and in one embodiment about 10% to about 90% by weight of such diluent.

The lubricating oil or functional fluid composition may have a viscosity of up to about 300 cSt at 100° C., and in one embodiment about 100 to about 300 cSt at 100° C., and in one embodiment from about 100 to about 280 cSt at 100° C.

The lubricating oil composition may have an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40, 10W-50, 70W-90, 80W-140 or 140.

The lubricating oil or functional fluid composition may be characterized by a sulfur content of up to about 2% by weight, and in one embodiment from about 0.01 to about 1% by weight, and in one embodiment from about 0.01 to about 0.25% by weight, and in one embodiment about 0.05 to about 0.25%, and in one embodiment about 0.10 to about 0.25% by weight, and in one embodiment about 0.10 to about 0.20% by weight, and in one embodiment about 0.10 to about 0.15% by weight.

The lubricating oil composition may be characterized by a phosphorus content in the range of up to about 0.2% by weight, and in one embodiment up to about 0.15% by weight, and in one embodiment up to about 0.12% by weight, and in one embodiment up to about 0.10% by weight, and in one embodiment up to about 0.08% by weight, and in one embodiment up to about 0.07% by weight, and in one embodiment up to about 0.06% by weight, and in one embodiment up to about 0.05% by weight. In one embodiment, the phosphorus content may be in the range from about 0.005% to about 0.08% by weight, and in one embodiment from about 0.005% by weight to about 0.07% by weight, and in one embodiment from about 0.005% by weight to about 0.06% by weight, and in one embodiment from about 0.005% by weight to about 0.05% by weight.

The ash content of the lubricating oil or functional fluid composition as determined by the procedures in ASTM D-874-96 may be in the range of about 0.3 to about 1.2% by weight, and in one embodiment about 0.3 to about 1.1% by weight, and in one embodiment about 0.3 to about 1.0% by weight, and in one embodiment about 0.5 to about 1.0% by weight.

In one embodiment, the lubricating oil or functional fluid composition may be characterized by a chlorine content of up to about 100 ppm, and in one embodiment up to about 50 ppm, and in one embodiment up to about 10 ppm.

EXAMPLE 2

Three lubricating oil compositions having a phosphorus content of 0.05% by weight are tested for Cameron Plint TE77 High Frequency Friction, 4-Ball Wear, and High Frequency Reciprocating Rig Wear (HFRR). Each of the lubricating oil compositions is the same except that different overbased calcium sulfonate detergents are used. Samples C-1 and C-2 are not within the scope of the invention, but are provided for purposes of comparison. Sample C-1 employs an overbased calcium sulfonate detergent containing amorphous calcium carbonate. Sample C-2 employs an overbased calcium sulfonate detergent containing calcite. Sample 1, which is within the scope of the invention, employs an overbased calcium sulfonate detergent containing vaterite. The results of these tests are indicated in the table below.

The Cameron Plint TE77 High Frequency Friction Test involves the use of test parts (6 mm diameter AISI1010 steel balls of 60 Rockwell C hardness and hardened ground A1S1-01 guage plates of RC 60/Ra 0.2 microns) which are washed with textile spirits, dried, and inserted in a Cameron Plint TE77 High Frequency Friction Machine. The sample reservoir is then filled with 10 ml of the formulated lubricant to be tested, to which 1% by volume cumene hydroperoxide is added. The test is run at a 30 Hertz Frequency, 100 Newton Load, and 2.35 mm Amplitude. The temperature is first ramped over 15 minutes from room temperature to 50° C., and is then held for 15 minutes. The temperature is then ramped over 15 minutes to 100° C., where it is held for 45 minutes. Finally, the temperature is ramped over 15 minutes to 150° C. and held there for 15 minutes. The total test length is 2 hours. The friction coefficient is continuously recorded throughout the test. At the end of the test, the wear scar diameter on the 6 mm ball is measured using a Tukon Microhardness Tester microscope.

The 4-Ball Wear test is conducted using the procedure described in ASTM D4172. The procedure measures coefficient of friction.

The High Frequency Reciprocating Rig Wear (HFRR) test is conducted as follows. A 10 ml sample of test oil is top treated with 1% cumene hydroperoxide (80% technical grade). A 2-ml sample of test oil is placed in a reservoir. A pushrod holding a non-rotating steel ball is loaded to 500 grams and lowered until it contacts a test disk completely submerged in the oil. The oil temperature is elevated to 105° C. After the oil temperature has stabilized, the ball is rubbed against the disk with a 1 mm stroke at a frequency of 20 Hz for 75 minutes. The ball is removed from the pushrod and cleaned. The dimensions of the major and minor axes of the wear scar are measured under 100× magnification.

| Sample | 4-Ball (coefficient of friction) | HFRR (ball scar in microns) | Cameron Plint (wear scar in microns) |
|---|---|---|---|
| C-1 | 0.6 | 291 | 733 |
| C-2 | 0.57 | 212 | 505 |
| 1 | 0.45 | 168 | 432 |

EXAMPLE 3

Three metal working fluids are tested using the Falex No. 8 Tapping Torque No. 1251 Test. The Falex No. 8 Tapping Torque No. 1251 Test uses a production 10 mm cutting or forming tap to tap a nut blank with a cutting fluid. The torque is monitored during the tapping operation and when the initial torque reaches the set trigger torque the analysis begins. A delay in the start of the integration of torque is set in digits, each representing 5 degrees. When this value is reached, another digital meter sets the length of integration, again each digit representing 6 degrees. When the integration is complete, the average torque in Newton-meters is displayed for that test. Results are reported as percent efficiency. Average torque for six runs on the test fluid is compared to the average of eight runs on the standard reference fluid and calculated as:

% Efficiency=(Avg. torque of Ref. fluid (N–m)/Avg. Torque of Test Fluid (N–m)*100

Samples C-3 and C-4 are not within the scope of the invention, but are provided for proposes of comparison. Sample C-3 is a metal working fluid which employs an overbased calcium sulfonate detergent containing amorphous calcium carbonate. Sample C-4 is a metal working fluid which employs an overbased calcium sulfonate detergent containing calcite. Sample 2, which is within the scope of the invention, is a metal working fluid which employs an overbased calcium sulfonate detergent containing vaterite. The results are reported in the following table.

| Sample | Falex No. 8 Tapping Torque No. 1251 (% Efficiency) |
|---|---|
| C-3 | 90.70% |
| C-4 | 95.60% |
| 2 | 96.70% |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An overbased vaterite containing salt composition, comprising: a disperse medium, and a calcium salt and calcium carbonate dispersed in the disperse medium, at least about 50% by weight of the calcium carbonate being in the form of vaterite, the composition being substantially haze free.

2. The composition of claim 1 wherein the disperse medium comprises an aliphatic hydrocarbon, a cycloaliphatic hydrocarbon, an aromatic hydrocarbon, a liquid petroleum fraction, or a mixture of two or more thereof.

3. The composition of claim 1 wherein the calcium salt is derived from an organic sulfur acid, a carboxylic acid, a lactone, a phenol, or a combination of two or more thereof.

4. The composition of claim 1 wherein the composition has a TBN of up to about 400 mg of KOH per gram.

5. The composition of claim 1 wherein the composition has a diluent oil concentration of about 42% by weight and a viscosity in the range from about 50 to about 1000 cSt at 100° C.

6. The composition of claim 1 wherein the composition comprises solid particulates, the average size of the particulates being up to about 200 nanometers.

7. The composition of claim 1 wherein the composition has a Hazitron number of less than about 200.

8. The composition of claim 1 wherein the composition has a turbidity value of less than about 300 JTUs.

9. A concentrate comprising about 1% to about 99% by weight of a diluent, and the composition of claim 1.

10. A lubricating oil or functional fluid composition comprising a base oil and the composition of claim 1.

11. The lubricating oil or functional fluid composition of claim 10 wherein the lubricating oil or functional fluid composition further comprises one or more of a detergent, dispersant, extreme pressure agent, antiwear agent, corrosion inhibitor, oxidation inhibitor, pour point depressant, color stabilizer, anti-foam agent, friction modifier, or mixture of two or more thereof.

12. A process for making an overbased vaterite containing salt composition. comprising: (i) mixing an overbased amorphous calcium carbonate containing salt composition with water and an alcoholic mixture comprising at least one lower alcohol and at least one midlevel alcohol; and (ii) contacting the resulting mixture with an acidic material comprising $CO_2$ until at least about 50% by weight of the amornhous calcium carbonate is converted to vaterite;
wherein the weight ratio of water to alcohol is in the range from about 1:10 to about 1:30.

13. The process of claim 12 wherein the weight ratio of lower alcohol to midlevel alcohol is in the range from about 7:1 to about 1:2.

14. The process of claim 12 wherein the temperature during step (ii) is in the range from about 45° C. to about 60° C. and the weight ratio of water to alcohol is in the range from about 1:10 to about 1:20.

15. The process of claim 12 wherein the weight ratio of lower alcohol to water is in the range from about 7:1 to about 20:1.

16. The process of claim 13 wherein the weight ratio of the combination of lower alcohol and water to midlevel alcohol is in the range from about 1:1 to about 5:1.

17. The process of claim 13 wherein the temperature during step (ii) is in the range from about 55° C. to about 80° C. and the weight ratio of the combination of lower alcohol and water to midlevel alcohol is in the range from about 1:1 to about 3:1.

18. A process for making an overbased vaterite containing salt composition, comprising: (i) mixing an overbased amorphous calcium carbonate containing salt composition with water and an alcoholic mixture comprising methanol, isobutyl alcohol and amyl alcohol; and (ii) contacting the resulting mixture with $CO_2$ at a temperature in the range from about 45° C. to about 80° C. until at least about 50% by weight of the amorphous calcium carbonate is converted to vaterite, the overbased amorphous calcium carbonate containing salt composition containing a remaining amount of calcium oxide and/or calcium hydroxide at the start of step (ii) and the amount of $CO_2$ used in step (ii) being in excess on a molar basis of the remaining amount of calcium oxide and/or calcium hydroxide in the overbased amorphous calcium carbonate containing salt composition at the start of step (ii) as determined by DBN.

* * * * *